United States Patent [19]

Gay et al.

[11] 4,351,027

[45] Sep. 21, 1982

[54] ADAPTIVE RISER ANGLE POSITION REFERENCE SYSTEM

[75] Inventors: Tom A. Gay, Houston, Tex.; Gary L. Hartman, Fridley; Gunter Stein, New Brighton, both of Minn.

[73] Assignee: Honeywell Inc., Minneapolis, Minn.

[21] Appl. No.: 177,667

[22] Filed: Aug. 13, 1980

[51] Int. Cl.³ .................. G06F 15/20; B63H 15/00
[52] U.S. Cl. ........................... 364/432; 114/144 B; 364/449
[58] Field of Search .............. 364/432, 449, 460; 33/1 N, 1 H; 114/144 B

[56] References Cited

U.S. PATENT DOCUMENTS

| | | | |
|---|---|---|---|
| 3,121,954 | 2/1964 | Foster | 33/1 |
| 3,148,653 | 9/1964 | Shatto, Jr. et al. | 114/144 |
| 3,965,840 | 6/1976 | Blumberg | 114/144 B |
| 3,974,792 | 8/1976 | Burnell et al. | 114/144 B |
| 4,038,540 | 7/1977 | Roberts | 364/728 |
| 4,044,473 | 8/1977 | Crask | 33/1 H X |
| 4,051,350 | 9/1977 | Parent | 364/432 |
| 4,071,821 | 1/1978 | Harthill et al. | 364/728 X |
| 4,205,379 | 5/1980 | Fox et al. | 364/432 |

OTHER PUBLICATIONS

Triantafyllou, "The Design of a Dynamic Positioning System", IEEE, CH1478-7/79/0000-0498, 1979.
Dean, "A Riser Angle Positioning System (RAPS)", Paper No. OTC3755, Offshore Technology Conference, May 1980.
NESCO Report SN183-2A, Part I, "Dynamic Stress Analysis of the Mohole Riser System", National Engineering Science Company, Jan. 29, 1965.
Harris, *An Introduction to Deepwater Floating Drilling Operations,* Petroleum Publishing Company, 1972 (pp. 128-139).
Grimble, et al, "The Design of Dynamic Ship Positioning Control Systems Using Extended Kalman Filtering Techniques", IEEE, CH1478-7/79/0000-0488, 1979.

*Primary Examiner*—Jerry Smith
*Attorney, Agent, or Firm*—Charles L. Rubow

[57] ABSTRACT

An adaptive riser angle position reference system and method for determining the horizontal position of a marine vessel relative to an underwater wellhead from angular deviations from vertical of a riser between the vessel and the wellhead are disclosed. The system comprises sensors for determining deviation from vertical of the riser at positions proximate the wellhead and the vessel and a compensation filter for adaptively filtering signals indicative of the lower and upper riser angles in accordance with filter coefficients which are determined by riser parameters. The filter coefficients are established by riser parameter identification means which effectively compares riser response, as indicated by the lower and upper riser angles, with the responses of a plurality of riser models, and selects filter coefficients corresponding to the most accurate model.

15 Claims, 5 Drawing Figures

ADAPTIVE RISER ANGLE POSITION REFERENCE SYSTEM

BACKGROUND OF THE INVENTION

The invention herein described pertains generally to determining the position of a marine vessel, and more specifically to adaptive means for processing signals indicative of the deviation from vertical of a marine riser to produce an estimate of horizontal vessel position.

There is increasing interest in exploring for oil and minerals on or beneath the ocean beds in deep water, producing oil and minerals from such locations, conducting marine research in very deep water and maintaining and servicing equipment used in connection with the foregoing activities. Such activities require the ability to rapidly and accurately ascertain marine vessel position relative to an underwater location of interest. High quality position information is also demanded in other specific applications in which it is required to maintain fixed position of a floating marine vessel.

A variety of schemes have been developed for determining marine vessel position. Acoustic systems have been increasingly used because they do not require physical connection to the ocean bed or object of interest, and because of their potential capability of producing accurate position information in very deep water. However, the quality of position indications produced by acoustic systems is generally dependent on acoustic paths having constant transmission characteristics. The subsea environment typically does not provide ideal acoustic transmission paths. Factors resulting in variable transmission characteristics include reflection and/or refraction of signals from thermal layers in the water, scattering of signals from water borne particles and reflection of signals from underwater structures. These factors may result in spurious indications of vessel position or complete loss of position information for short periods of time. In addition, acoustic signals emanating from sources other than the position indicating system may cause spurious position determinations. These factors produce a severe acoustic signal transmission environment having effects on signal transmission which are not presently susceptible of complete analysis. The uncertainties in operation of an acoustic position indicating system are not acceptable in the most critical vessel positioning applications. Accordingly, it may be desired or required to have an alternative or backup system other than an acoustic system. Obviously, in critical applications such an alternative or backup system also must be capable of reliably and accurately indicating vessel position.

One alternative system and technique which has been used to determine the horizontal position of a marine vessel relative to an underwater wellhead is to sense the deviation from vertical of a marine riser, oil well drill string, or cable extending from the vessel to the wellhead or a location near the wellhead. For simplicity the remainder of the discussion will refer only to a riser, with the understanding that the system or technique may actually involve a drill string, cable or other flexible member suspended from the vessel. A signal indicative of the angular deviation may be used in a system to display and/or control vessel position. Angular deviation of the riser from vertical typically has been sensed by a sensor located near either the upper or the lower end of the riser. Such a scheme is satisfactory provided that the riser acts in a predictable fashion. Riser dynamics are reasonably predictable for shallow water depths. However, as the water depth increases, the measured angles become increasingly less a direct indicator of vessel position.

U.S. Pat. No. 4,205,379 issued in the name of M. Fox, et al discloses a version of a riser angle reference system which offers some improvement over conventional systems. It includes sensors for sensing the instantaneous vertical slope angles of the riser at both its upper and lower ends. The angle signals are filtered to remove higher order frequencies and combined in accordance with a position equation which compensates for phase lag at the lower sensor. Although such an approach is superior to one which utilizes a single riser angle, it is limited in capability to producing a position estimate based on only one assumed riser response for each pair of measured angles at any given depth. Such an assumption is not valid in many instances.

A long riser acts in a very flexible manner and deviates substantially from a straight line between the vessel and the wellhead. It has various response modes depending on excitation stimuli, riser parameters and other factors. The various modes result in different riser shapes, e.g., an s shape. The first several lower order modes fall within the response range of a typical dynamic positioning system (i.e., a positioning system which utilizes thrusters to maintain vessel position). Accordingly, the various modes must be correctly accommodated to achieve satisfactory position control.

Riser excitation stimuli include currents which differ substantially at different depths, and wind and wave action. There is a substantial delay between the time that vessel motion occurs and the time at which corresponding motion appears at the lower end of the riser. Angular deviation at both ends of the riser is contaminated with higher frequency responses to wind and waves which are typically alternating in nature. Particularly in connection with wave action, the period of vessel movement is relatively short and the vessel is continuously driven a short distance either side of and then returned to its desired position. With reference to vessel position control, significant energy would be required to attempt to oppose this action. Further, such operation is not required in most applications and would be grossly inefficient in terms of equipment operation and fuel consumption.

It has been found that the overall quality of position indication of a riser angle reference system can be much improved by detecting angular deviations at both the upper and lower ends of the riser and filtering the signals indicative of the angles in an adaptive filter whose coefficients are adjusted in accordance with a best fit mathematical model of the riser selected from a plurality of riser models. Accordingly, the useful position information reflected in the angles can be extracted for any important riser mode while avoiding the complications caused by lag at the lower end of the riser and extraneous high frequency components at the upper end of the riser.

SUMMARY OF THE INVENTION

An adaptive riser angle position reference system in accordance with this invention basically comprises angle sensing means for producing signals indicative of deviation from vertical of the riser at its upper and lower ends. The angle signals are combined and supplied to a compensation filter which adaptively attenuates various groups of frequency components. The filter coefficients are automatically adjusted in accordance with riser parameters identified by riser parameter identification means which effectively compares the riser response as indicated by the angle signals with a plurality of riser model responses, and adjusts the compensation filter coefficients in accordance with the model response which most closely approximates that of the riser. The output of the compensation filter may be supplied to a high pass filter, and a weighted sum of the angle signals may be supplied to a low pass filter whose output is summed with the output of the high pass filter to obtain a estimated position signal.

According to the position referencing method of the present invention, upper and lower riser angles are sensed and the angular information filtered in accordance with filter coefficients which are adaptively determined by the riser parameters. The filter may be of a form which attenuates bands of frequency components at two center frequencies and frequency components above a multiple of one of the center frequencies. The attenuated signal and a combination of the angle signals may be passed through a high pass filter and a low pass filter respectively, and combined to produce an estimated position signal. The filter center frequencies and other characteristics may be determined by comparing the riser response with responses of a plurality of riser models and supplying filter coefficients based on the closest model.

BRIEF DESCRIPTION OF THE DRAWINGS

FIG. 4 which includes

DESCRIPTION OF THE PREFERRED EMBODIMENT

Figure 1:
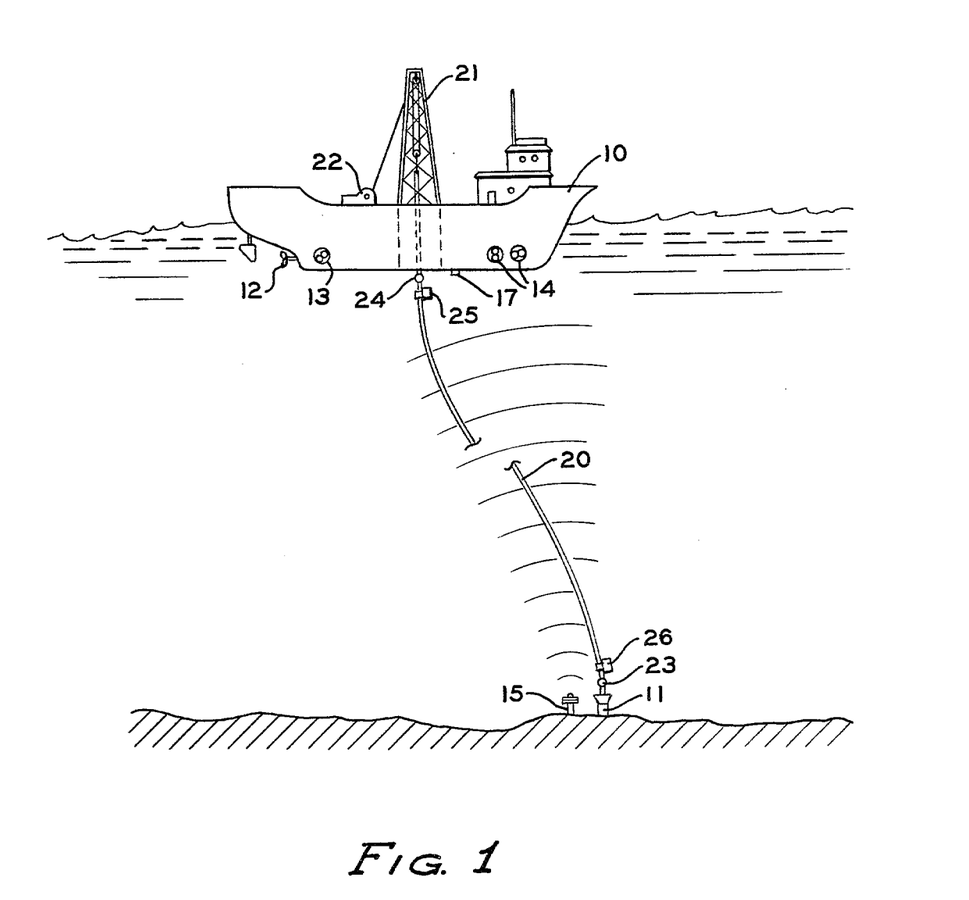
FIG. 1 is a schematic illustration of a marine vessel employing an adaptive riser angle position reference system in accordance with the present invention.

In FIG. 1, reference numeral 10 identifies a floating marine vessel designed and equipped to drill for oil under the sea bed in very deep water, e.g., up to 6,000 feet. Such activity requires reliable, current and accurate information as to horizontal position of the vessel relative to a subsea wellhead identified by reference numeral 11.

Vessel 10 is shown equipped with a dynamic positioning system comprising a main screw 12 and fixed asmuth transverse thrusters 13 and 14 respectively located fore and aft of the center of rotation of the vessel for maintaining the vessel in a desired position above the wellhead. For illustrative purposes, thrusters 13 and 14 are shown as tunnel thrusters. However, other types and configurations of propulsion units may be equally suitable. As is well known from various references, including previously noted U.S. Pat. No. 4,205,379 and U.S. Pat. No. 3,148,653 issued in the name of H. L. Shatto, Jr., et al,, the propulsion units may be automatically controlled in response to signals derived from sensed location and heading of vessel 10. Heading can be sensed by means of a gyro compass, magnetic compass, or other suitable heading sensor. Horizontal location in two vertical planes may be sensed by various means, of which a free standing beacon acoustic system and a riser angle reference system are shown in FIG. 1. For simplicity, only the portion of the free standing beacon acoustic system for determining location along the fore aft vessel axis will be described. Location along an athwartship axis can be analogously determined.

The beacon system comprises an acoustic beacon 15 which is located in a fixed positional relationship with wellhead 11. Beacon 15 may transmit an acoustic signal comprising a periodic tone of a known carrier frequency. The acoustic signal is received by hydrophone apparatus 17 mounted on vessel 10. The hydrophone apparatus may include three hydrophone elements of which pairs of elements are located along orthogonal horizontal axes, one element being common to both axes.

The angular displacement of hydrophone apparatus 17 from a position directly over beacon 15 results in phase differences in the acoustic signal received by separate hydrophone elements. The magnitude of such phase differences is indicative of the horizontal location of the vessel relative to the wellhead, and may be used to display and/or control vessel position in a known manner. A digital phase determining system in accordance with the foregoing description is disclosed in detail in U.S. Pat. No. 4,038,540 for a Quadrature Correlation Pulse Detector issued July 26, 1977 in the name of J. L. Roberts, and U.S. Pat. No. 4,071,821 for Quadrature Correlation Phase Determining Apparatus issued Jan. 31, 1978 in the names of W. P. Harthill and J. L. Roberts.

Such a free standing beacon acoustic system offers many advantages in determining vessel position, especially in deep water. However, as previously indicated, acoustic systems are affected by the quality of the acoustic signal path between the beacon and the hydrophone, and may produce spurious position determinations or fail to provide updated position determinations for short intervals of time under adverse conditions. Accordingly, in circumstances in which position information is critical, it is desirable or necessary to have an alternative or backup position determining system.

One such critical circumstance occurs when the vessel is connected to the wellhead through a marine drilling riser as identified by reference numeral 20. Such a riser is used to provide a return fluid flow path between the well bore and the vessel and to guide a drill string to the wellhead. For deep water operation, the riser is maintained in tension by means of a derrick 21 and tensioning apparatus 22.

As is apparent, the angular position of riser 20 relative to vertical is generally indicative of the position of vessel 10 relative to wellhead 11. However, as illustrated in FIG. 1, the riser generally does not follow a straight line between the vessel and the wellhead. Riser response in general, and particularly its dynamic response, are very complicated as briefly discussed in Harris, *An Introduction to Deep Water Floating Drilling Operations*, Petroleum Publishing Company, 1972, pages 128 et seq. Static factors which affect riser response include tension and the weight of the drilling mud, drill pipe and the riser. Dynamic factors include wave and current loading (vortex shedding), variations in riser tension and vessel motion due to wind, waves and current. A lower flexible joint or ball joint, as identified by reference numeral 23, is typically used in a marine riser system to minimize bending moments and stress concentrations. In deep water operations or in severe sea conditions an upper ball joint as identified by reference numeral 24 is also included in the riser.

Deviation from vertical of the riser can be sensed by means of a riser angle sensor. Such sensors are commercially available from a number of manufacturers, including Honeywell Inc. and Delco Electronics Div., General Motors Corp. In the apparatus of FIG. 1, upper and lower riser angle sensors identified by reference numerals 25 and 26 respectively are provided. These sensors are attached to the riser proximate the upper and lower ball joints. A common type of riser angle sensor comprises a pendulum which is free to swing about a vertical axis. Means is provided for sensing the pendulum position in orthogonal vertical planes and producing corresponding pendulum position signals. These signals may be processed for transmission in the sensor and transmitted to the vessel through any suitable transmission link. In the present application where loss of an acoustic link is of concern, these signals may be transmitted through an electrical cable not illustrated in FIG. 1 associated with the riser.

Figure 2:
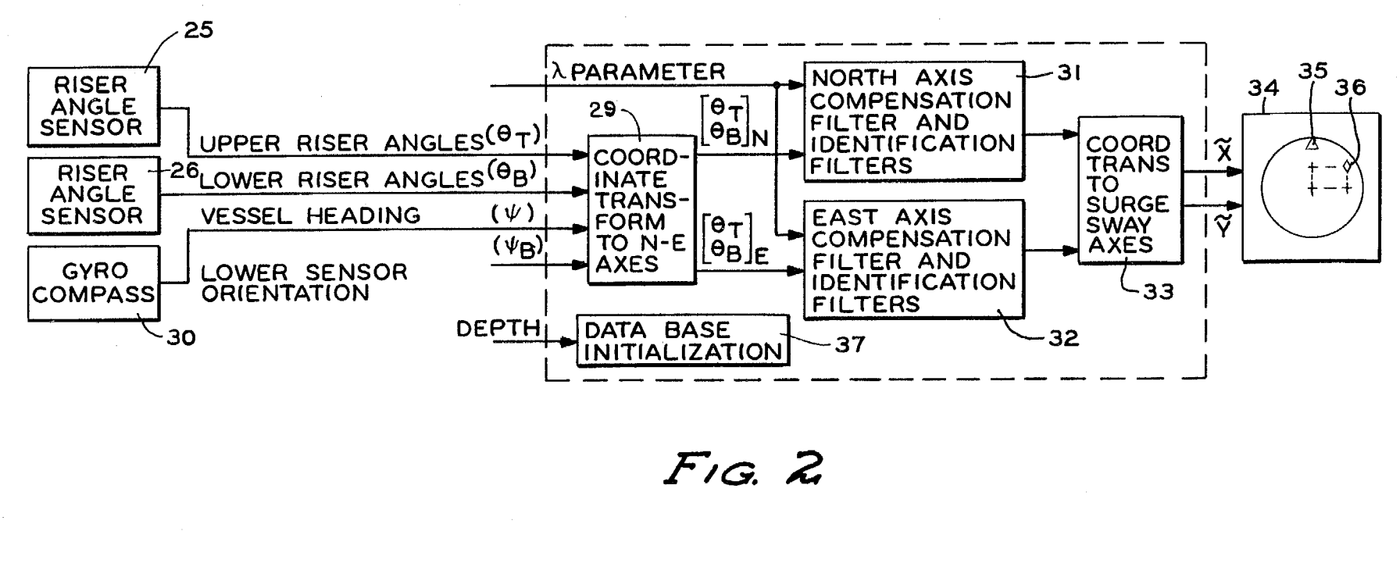
FIG. 2 is a general block diagram of the adaptive riser angle position reference system employed on the vessel of FIG. 1.

With reference to the general block diagram of FIG. 2, the desired outputs for a position indicator or an automatic position control system for a vessel of the type shown in FIG. 1 are in terms of fore-aft or surge displacement, designated as X, and athwartship or sway displacement, designated as Y. Upper and lower riser angle sensors 25 and 26 are generally not oriented to the same coordinate system, and neither is generally oriented to a coordinate system corresponding to the surge-sway axes of the vessel. In order to combine the angular information provided by sensors 25 and 26 it is necessary to transform the angle signals to a common coordinate system. The transformation is accomplished as indicated by block 29 using the upper riser angles $\theta_T$, the lower riser angles $\theta_B$, the vessel heading $\psi$ and the lower sensor orientation $\psi_B$. Vessel heading is determined from a gyro compass 30 or other suitable heading sensor located on the vessel.

Information as to lower sensor orientation may be known or directly measurable in some instances. In other instances, due to uncertainties in landing a blowout preventer stack and connected riser on a subsea wellhead, the heading of the lower riser angle sensor may not be known accurately in earth referenced coordinates. However, the heading of the lower riser angle can be deduced from angular responses indicated by the upper and lower riser angle sensors. One suitable process involves introducing a delay into the upper sensor signal, passing the signals through a band pass filter, and performing a least squares error comparison of the signals.

The output of the coordinate transformation block comprises information as to deviation of the upper and lower riser from vertical in a north-south (hereinafter, north) plane and deviation of the upper and lower riser from vertical in an east-west (hereinafter, east) plane. The angular deviation information in the north plane is supplied to a north axis compensation filter and identification filters identified by block 31. Similarly, the angular deviation information in the east plane is supplied to an east axis compensation filter and identification filters identified by block 32. The compensation and identification filters represent the riser in the form of a modal model based on a partial differential equation which describes the physics of the riser. The basic modeling equation is a fourth order equation $$EI\frac{\delta^4 x}{\delta h^4} - \frac{\delta}{\delta h}\left[T(h)\frac{\delta x}{\delta h}\right] + m_T\frac{\delta^2 x}{\delta T^2} = f$$

where
- $EI$ = riser beam stiffness
- $x$ = lateral riser deflection
- $h$ = height
- $T$ = riser tension
- $m_T$ = apparent riser mass/unit length (i.e., combined weight of riser and drilling mud minus buoyancy)
- $f$ = distributed forces on riser The Filter blocks 31 and 32 are also supplied with a weighting factor $\lambda$ used to adjust the weighting to be attributed to the upper and lower riser angles for a desired steady state relationship. This permits the low frequency relationship between the upper and lower riser angles to be adjusted independently of any system loop gain.

The outputs of filter blocks 31 and 32 represent vessel displacement along north and east axes, respectively. These outputs are supplied to a second coordinate transformation block identified by reference numeral 33 which transforms them into a surge-sway coordinate reference system usable by the vessel position indicating and/or control system.

As shown for illustrative purposes, outputs X and Y of transformation block 33 are supplied to a position display or indicator 34. In one form, indicator 34 may comprise a cathode ray tube in which the center of the screen represents vessel location, triangular symbol 35 indicates a reference direction (e.g., north) relative to vessel heading represented by the top of the CRT screen, and diamond symbol 36 indicates location of the wellhead relative to the vessel along orthogonal horizontal axes.

Reference numeral 37 identifies a data base initialization block in which a data base containing certain filter coefficients used in the identification and compensation filters is established. The filter coefficients are determined by operating depth which is manually entered by an operator.

Figure 3:
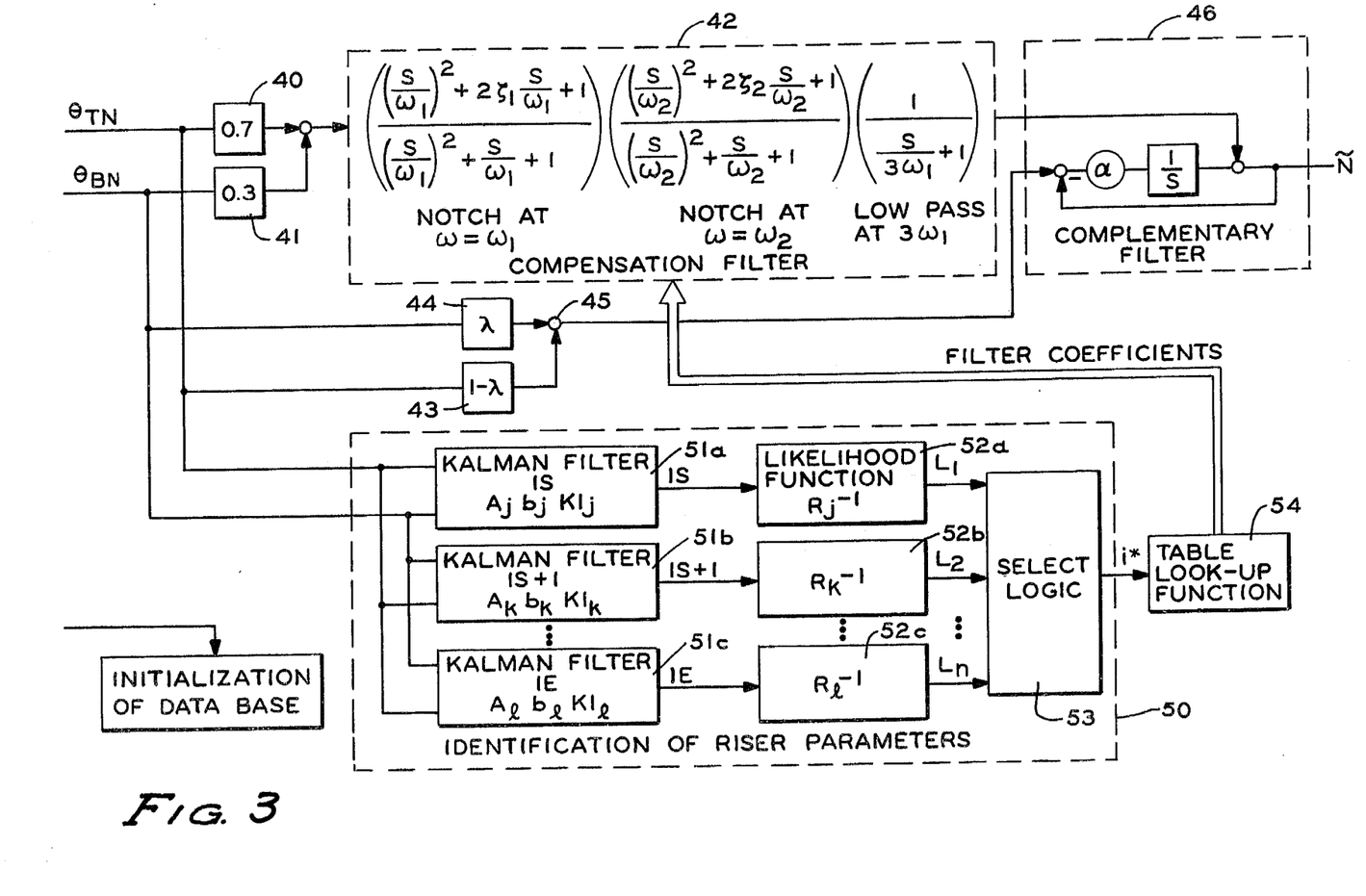
FIG. 3 is a more detailed block diagram of the filter concept and functional principles employed in the adaptive riser angle position reference system of FIG. 2.

Each of the filter blocks 31 and 32 performs identical operations as indicated in FIG. 3. Only filter block 31 will be further described. The applicants have determined that the riser can be satisfactorily modeled by means of a fifth order compensation filter with four parameters that are adjustable on the basis of frequency and damping parameters of the riser. The compensation filter has the form of two notch filters plus a low pass filter, and can be represented by the function $$\left(\frac{S/\omega_1^2 + 2\zeta_1 S/\omega_1 + 1}{S/\omega_1^2 + S/\omega_1 + 1}\right)\left(\frac{S/\omega_2^2 + 2\zeta_2 S/\omega_2 + 1}{S/\omega_2^2 + S/\omega_2 + 1}\right)\left(\frac{1}{S/3\omega_1 + 1}\right)$$

where the first parenthetical expression represents a notch filter centered on a frequency $\omega_1$, the second parenthetical expression represents a notch filter centered on frequency $\omega_2$ and the third parenthetical expression represents a low pass filter having an upper cutoff frequency of $3\omega_1$.

Information as to the upper and lower riser angles is weighted by factors of 0.7 and 0.3, respectively, as indicated by blocks 40 and 41 and summed to provide an input to a compensation filter as previously described identified by block 42. Although a specific linear weighting relationship is shown, other linear or nonlinear relationships are satisfactory and may be preferred under certain conditions.

Information as to the upper and lower riser angles is also weighted by factors of 1-λ and λ, respectively, as indicated by blocks 43 and 44 and summed as indicated at 45. The outputs of compensation filter 42 and summing point 45 are supplied to a complementary filter 46 in which components of the compensation filter output above a predetermined frequency and components of the output of summing point 45 below a predetermined frequency are combined to provide an estimated vessel position along a north axis.

The variable parameters of compensation filter 42, $\omega_1$, $\omega_2$, $\xi_1$ and $\xi_2$ are varied in accordance with riser parameters. However, it has been found that the filter parameters do not need to be continuously adapted to the riser parameters. Furthermore, for a given depth, the most significant riser parameter is the damping coefficient. If this can be determined to one of several intervals, then a compensation filter having appropriate characteristics can be achieved. This suggests a simple discrete minimization algorithm for each interval. Accordingly, the riser parameter identification block 50 includes a plurality of Kalman filters 51a–51c, each covering an interval of the damping parameter. Each Kalman filter is a 12 state filter. The Kalman filter coefficients $A_i$, $b_i$ and $K_i$ are indexed with riser parameters. As indicated in the discussion of FIG. 2, the data base containing certain filter coefficients is determined by operating depth and is established during initialization of the data base.

Each filter effectively processes the riser angle signals so as to compare riser response with responses of a plurality of riser models, and generates a likelihood function as indicated by blocks 52a–52c indicative of how closely each model approximates the response of the riser. The minimum likelihood function indicates the interval containing the riser parameters. The minimum likelihood function is selected by selection logic as indicated at block 53 to produce a filter index i*. The filter index is used in conjunction with a lookup table 54 to adjust coefficients of compensation filter 42.

Figure 4A:
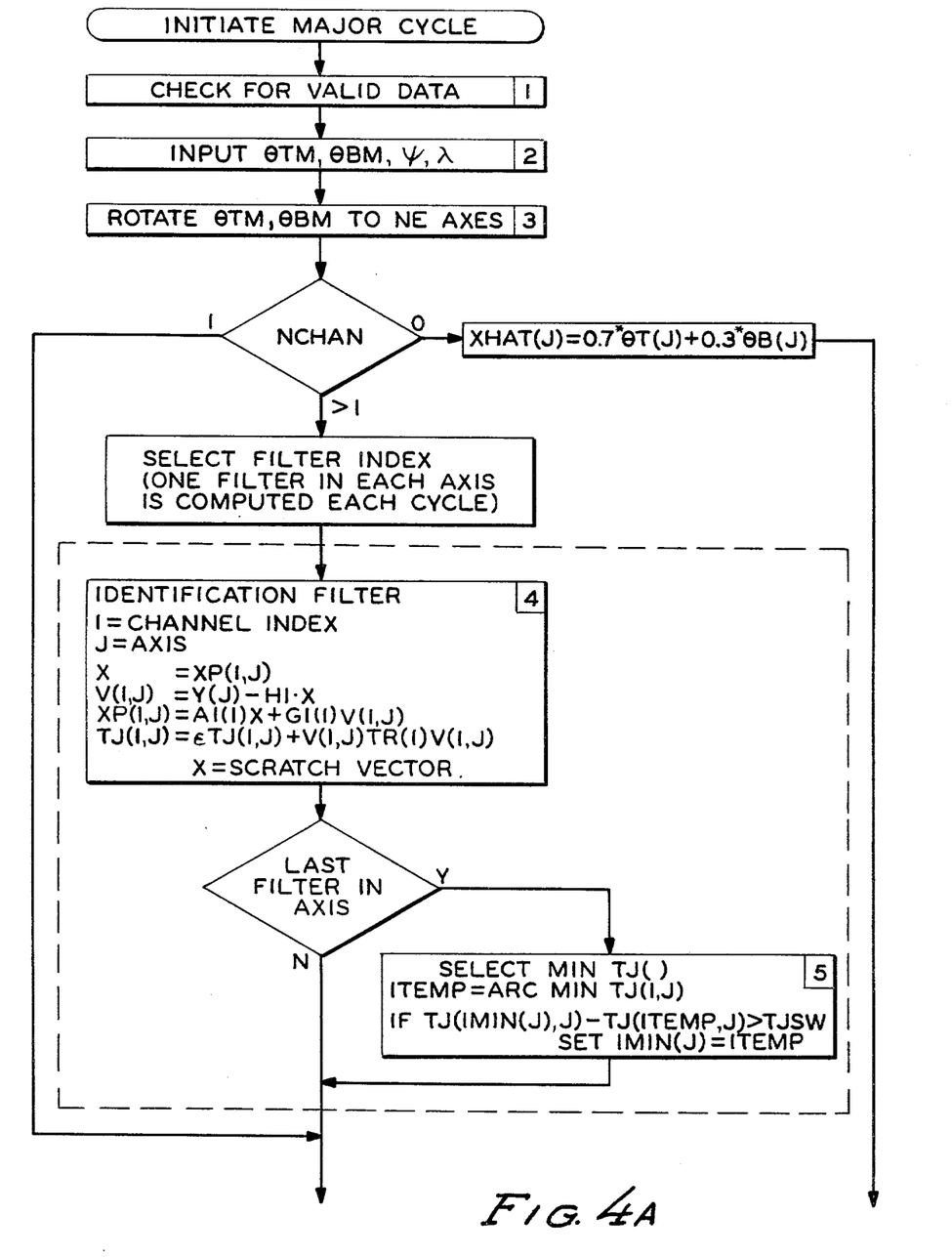
FIGS. 4A and 4B is a flow chart of a preferred software implementation of the signal processing portions of the adaptive riser angle position reference system of FIGS. 2 and 3.
Figure 4B:
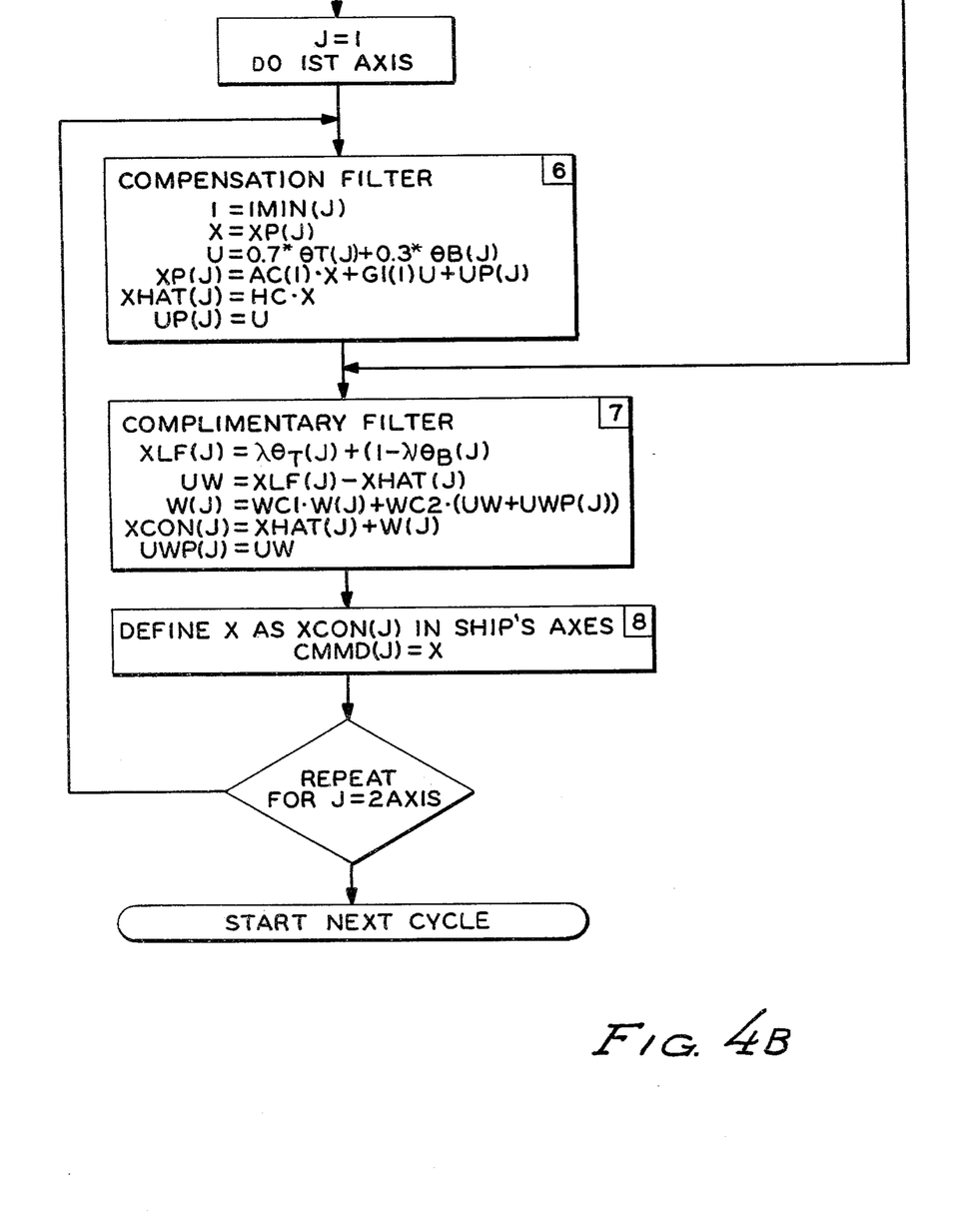

Signal processing for the adaptive riser angle position reference system is preferably accomplished through a software routine implemented on a digital computer. A flowchart for a suitable software routine is shown in FIG. 4 in which the principal real-time tasks which must be executed each cycle are set forth in numbered boxes. A brief description of each principal real-time task and certain other necessary tasks is set forth below.

The filter and identifier software contains a set of initialization tasks and a set of real-time tasks. The initialization tasks must be performed prior to entering the real-time operation and may be required by operator input at any subsequent time. The real-time tasks continue uninterrupted cyclically until the system is shut down or reset.

The initialization tasks require knowledge and entry of water depth to define the set of identification and compensation filters to be used. The set of filters thus defined covers the range of riser frequencies likely to be encountered at the entered depth. A change in water depth requires a re-initialization by the operator. The total data set of filter coefficients for the entered depth is automatically stored in a scratch memory. An operable embodiment was designed with 14 channels, as shown in Table 1. For purposes of this description, a channel comprises an identification filter and a compensation filter corresponding to a specific set of riser frequency and damping parameters. These channels are used for both north and east axis identification and compensation.

The initialization defines number of channels (NCHAN) and the starting (IS) and ending (IE) channel index for the indicated depth as shown in Table 1. The constant used in the complementary filter is $$\alpha = \alpha_{c1} + \alpha_{c2} \cdot H$$

where $\alpha$ is generally the frequency at which the predominant influence of the inputs to the complementary filter on its output shifts between the input provided by the compensation filter and the input provided by summing point 45. The filter coefficients for a discrete form of complementary filter (see real-time Task 7) are:

$$\omega_{c1} = (2 - \alpha)/(2 + \alpha)$$

$$\omega_{c2} = \frac{1.0 - \omega_{c1}}{2}$$

The HI measurement matrix (see Table 3) contains a single element with depth dependence that must be computed.

$$HI = \begin{bmatrix} -2 & 0.28 & -2 & 0.28 & -2 & 0.28 & -2 & -0.28 & 9 & -1.18\frac{H}{32.2} & 0 \\ 2 & -0.28 & -2 & 0.28 & 2 & -0.28 & -2 & -0.28 & 1 & -0.14 & 0 & 0 \end{bmatrix}$$

The parameters $\xi$, TJSW, IMIN (1) and IMIN (2) must be defined, and filter variables TJ(I,J), XPI(I,J), VI(I,J), XPC(J), UP(J), W(J) and UPW(J) must be initialized at zero.

The set of real-time tasks which are executed each cycle are shown in flow chart form in FIG. 4. The flow chart indicates the sequencing of tasks and the corresponding equations. The inputs and outputs are described in Table 2. The variables are listed and defined in Table 3 and the tasks are referenced by numbers in the flow chart.

Task 1—Check selection discretes for riser angles and heading angle. If valid data available continue, otherwise set bad data flag and wait for next cycle to recheck validity.

Task 2—Input data. Obtain the upper ($\theta_{TM}$) and lower ($\theta_{BM}$) riser angles, the vessel heading sine and cosine, the two set points for surge and sway and the λ parameter from the input processor.

Task 3—Rotate all riser angle measurements to north-east axes for identification and compensation.

Input: $\theta_{TM(J)}$, $\theta_{BM(J)}$1, sin $\psi$, cos $\psi$, $\psi_{RA}$
Output: $\theta_{T(J)}$, $\theta_{B(J)}$
The bottom angle is rotated by $\psi_{RA}$ $$\begin{Bmatrix} \theta_{B1} \\ \theta_{B2} \end{Bmatrix} = \begin{bmatrix} \cos \psi_{RA} & \sin \psi_{RA} \\ -\sin \psi_{RA} & \cos \psi_{RA} \end{bmatrix} \begin{bmatrix} \theta_{BM1} \\ \theta_{BM2} \end{bmatrix}$$

The top angle is rotated by vessel heading to northeast coordinates $$\begin{Bmatrix} \theta_{T1} \\ \theta_{T2} \end{Bmatrix} = \begin{bmatrix} \cos\psi & \sin\psi \\ -\sin\psi & \cos\psi \end{bmatrix} \begin{bmatrix} \theta_{TM1} \\ \theta_{TM2} \end{bmatrix}$$

From this point forward, a completely identical set of tasks exists for the north and east axes. To identify the variables in each axis, they will be indexed by the argument "J" where J=1 indicates the north axis and J=2 the east axis. The measurement vector is defined as $$Y(J) = \begin{bmatrix} \theta_T(J) \\ \theta_B(J) \end{bmatrix}$$

where $\theta_T(J)$=Jth axis top angle
$\theta_B(J)$=Jth axis bottom angle
Task 4—Update identification filters.
Input: Y(J), 2×1 vector of top and bottom riser angle for each axis
Output: TJ(I,J), the likelihood function for the $I^{th}$ filter of axis J
At each depth range there are a number of identification filters to be evaluated. The number (NCHAN) is defined in the initialization as a function of water depth. The matrix equations are:
x=XPI(I,J)(update state)
VI(I,J)=Y(J)−HI·x(compute residual)
XPI(I,J)=AI(I)x+GI(I)*VI(I,J)(predict state)
TJ(I,J)=ξ·TJ(I,J)+VI(I,J)$^T$*R(I)*VI(I,J)
I=channel index ranging from IS to IE as defined in initialization
J=axis index, ranging from 1 to 2
X=12-component state-scratch vector
XPI(I,J)=12-component residual
VI(I,J)=2-component residual
AI(I)=12×12 riser model matrix indexed by channel number
GI(I)=12×12 Kalman gain matrix indexed by channel number
HI=2×12 measurement matrix
R(I)=weighting matrix for filter residuals indexed by channel number
ξ=deweighting-constant
TJ(I,J)=Scalar likelihood function for filter I, Axis J
The matrixes AI(I), GI(I) and R(I) can be stored in any convenient fashion that allows them to be appropriately indexed. The above filter calculations must be repeated for up to four indexes as defined by channel index for each axis.
Task 5—Select channel corresponding to the minimum likelihood function.
Input: TJ(I,J), I=IS . . . IE, J-1,2, the likelihood function values for this cycle
Output: IMIN(J), the channel number of the smallest likelihood function for the axis J
Set ITEMP(J)=the I corresponding to the minimum TJ(I,J) for each J, where I is the same set of indexes (up to four) used in Task 4. An initial value of IMIN(J) was defined in the initialization section. A difference of at least TJSW must exist between the value of TJ(I-MIN(J),J) and the value of TJ(ITEMP(J),J) before IMIN(J) is updated. If this threshold is satisfied, then set IMIN(J)=ITEMP(J).

Task 6—Execute compensation filter for parameter set defined by IMIN(J).
Input: Y(J), IMIN(J)
Output: XHAT(J) (first state in compensation filter)
The compensation filter is fifth-order, defined by the following matrix equations:
Set I=IMIN(J)
X=XPC(J) (left from last cycle, zero initially)
U(J)=[0.7, 0.3]Y(J)(a vector dot product)
XPC(J)=AC(I)*X+GC(I)*(U(J)+UP(J))
XHAT(J)=HC*X
UP(J)=U(J)
where
XPC(J)=5-component state for compensation filter
U(J)=Scalar input to filter for axis J
UP(J)=previous value of U(J)
AC(I)=5×5 compensation filter plant matrix indexed by minimum channel
GC(I)=5×1 compensation gain matrix indexed by minimum channel
X=5-component scratch vector
HC=5×1 output matrix=[1,0,0,0,0]
Task 7—Execute complementary filter
Input: XHAT(J), Y(J)
Output: XCON(J)
The equations are $$XLF(J)=\lambda\theta_T(J)+(1-\lambda)\theta_B(J)$$

$$W(J)=W_{c1}*W(J)+W_{c2}*(UW(J)+UWP(J))$$

where
UW(J)=XLF(J)−XHAT(J) can be a scratch variable
UWP(J)=UW(J) at previous step time
λ=input weighting variable
The output calculation is:
XCON(J)=XHAT(J)+W(J)
Task 8—Convert control signal to surge-sway axes.
Input: XCON(J), STPT(J), sinψ, cosψ
Output: CMMD(J)
Rotate XCON to surge sway axes $$\begin{bmatrix} X(1) \\ X(2) \end{bmatrix} = \begin{bmatrix} \cos\psi & \sin\psi \\ -\sin\psi & \cos\psi \end{bmatrix} \begin{bmatrix} XCON(1) \\ XCON(2) \end{bmatrix}$$

where X is a scratch vector. Then $$\begin{bmatrix} CMMD(1) \\ CMMD(2) \end{bmatrix} = \begin{bmatrix} X(1) \\ X(2) \end{bmatrix}$$

TABLE 1

CHANNELS AS A FUNCTION OF WATER DEPTH

| Nominal (Ft) | Operating Range (Ft) | Number of Channels (NCHAN) | Indexes (IS, IE) |
|---|---|---|---|
| 0 | 0–750 | None (No Filters) | 0, 0 |
| 1000 | 750–1,250 | Compensation Filter Only | 1, 1 |
| 1500 | 1,250–2,250 | 2 | 2, 3 |
| 3000 | 2,250–3,750 | 3 | 4, 6 |
| 4500 | 3,750–5,250 | 4 | 7, 10 |
| 6000 | 5,250–6,750 | 4 | 11, 14 |

TABLE 2
IDENTIFIER/FILTER INPUTS AND OUTPUTS

Inputs

| | |
|---|---|
| $\theta$TM(1) | Top riser angle in sensor axes (referenced to surge-sway vessel axes). |
| $\theta$TM(2) | |
| $\theta$BM(1) | Bottom riser angle in sensor axes (referenced to north-east axes). |
| $\theta$BM(2) | |
| $\psi$RA | Orientation of bottom angle with respect to north-east coordinates |
| Sin$\psi$ | Sine of vessel heading |
| Cos$\psi$ | Cosine of vessel heading |
| H | water depth |
| $\lambda$ | Weighting parameter for steady-state control of upper and lower riser angles |

Outputs

| | |
|---|---|
| CMMD(1) | Surge axis reference |
| CMMD(2) | Sway axis reference |

TABLE 3
LIST OF VARIABLES

| Variable | Definition | Units |
|---|---|---|
| I | Channel (parameter) index | — |
| IS | Starting channel index | — |
| IE | Ending channel index | — |
| J | Axis index (1 or 2) | — |
| IFLAG | Set to 1 to indicate real-time code executing | — |
| NCHAN | Number of channels being computed | — |
| $\alpha$ | Reciprocal time constant for complementary filter | 1/sec |
| ac1, ac2 | Coefficients to define $\alpha$ as a function of depth | |
| $\lambda$ | Weighting parameter for top and bottom riser angles | — |
| $\psi$RA | Orientation of lower riser angle sensor with respect to north-east axes | rad |
| $\phi$ | Vessel heading | rad |
| $\epsilon$ | Deweighting constant of likelihood function | 1/sec |
| $\theta$TM | Measurement of top riser angle (two components) | % wd |
| $\theta$BM | Measurement of bottom riser angle (two components) | % wd |
| $\theta$T | Top riser angle in north-east coordinates | % wd |
| $\theta$B | Bottom riser angle in north-east coordinates | % wd |
| H | Water depth | ft |
| Y(J) | Measurement vector of top and bottom angle for axis J | % wd |
| X | Scratch vector used in computations | |
| XPI(I,J) | State vector for identification filters | |
| VI(I,J) | Residual vector for identification filters | |
| TJ(I,J) | Likelihood function | |
| AI(I) | Riser model matrix for identification filter | |
| GI(I) | Kalman gain matrix for identification filter | |
| HI | Measurement matrix for identification filter | |
| R(I) | Weighting matrix for identification filter residuals | |
| ITEMP(J) | Channel index minimizing likelihood function for axis J | |
| IMIN(J) | Channel index minimizing likelihood function and satisfying threshold. | |
| TJSW | Threshold parameter in selecting IMIN(J) | |
| XPC(J) | State vector for complementary filter | |
| U(J) | Input to complementary filter. Combination of upper and lower riser angle. | % wd |
| UP(J) | Value of U(J) at previous time step | |
| AC(I) | Riser model matrix for compensation filter | |
| GC(I) | Gain matrix for compensation filter | |
| HC | Output matrix for compensation filter | |
| XHAT(J) | Output of compensation filter | |
| XLF(J) | Combination of upper and lower riser angle used to set steady-state reference | |
| XCON(J) | Output of complementary filter | |
| W(J) | State for complementary filter | |
| UW(J) | Input to complementary filter (scratch quantity) | |
| UWP(J) | Value of UW(J) at previous time step | |
| WC1, WC2 | Filter coefficients in complementary filter | |
| CMMD(J) | Output in surge-sway axes | % wd |

Although a preferred embodiment of the applicant's adaptive riser angle position sensor and position sensing method have been illustrated and described in detail, numerous variations and alternative embodiments in accordance with the teachings herein will be apparent to those skilled in the art. For example, it is apparent that riser models and modeling techniques other than the specifically described embodiment and technique may be employed. The scope of coverage sought on this invention is not to be limited to the disclosed embodiment, but only by the terms of the appended claims.

The embodiments of the invention in which an exclusive property or right is claimed are defined as follows:

1. An adaptive riser angle position reference system for determining the horizontal position of a marine vessel supporting a riser which extends between the vessel and a subsea wellhead, comprising:
   a first vertical angle sensor for producing a lower angle signal indicative of deviation from vertical of the lower riser at a point proximate the wellhead;
   a second vertical angle sensor for producing an upper angle signal indicative of deviation from vertical of the upper riser at a point proximate the marine vessel;
   compensation filter means having filter characteristics which are variable in accordance with filter coefficients supplied thereto;
   riser parameter identification means connected to receive the lower and upper angle signals and operable to determine a riser model whose response approximates that of the riser and to supply corresponding filter coefficients to said compensation filter means;
   first transfer means for receiving the lower and upper angle signals and supplying corresponding signals to said compensation filter means, whereby the output of said compensation filter means is indicative of vessel position;
   utilization means; and
   second transfer means for receiving the output of said compensation filter means and supplying corresponding position information to said utilization means, whereby said utilization means is operable to indicate horizontal vessel position relative to the wellhead.

2. The position reference system of claim 1 wherein:
   a third transfer means is connected to receive the lower and upper angle signals, and is operable to produce a first weighted sum thereof; and
   said second transfer means includes a complementary filter for attenuating low frequency components in the output of said compensation filter, attenuating high frequency components in the first weighted sum of the lower and upper angle signals, and combining the resultant signals to produce the position information which is supplied to said utilization means.

3. The position reference system of claim 2 wherein said third transfer means includes manually adjustable means for weighting the lower and upper angle signals by complementary factors.

4. The position reference system of claim 1, 2 or 3 wherein said riser parameter identification means comprises:
processing means for comparing the lower and upper angle signals with corresponding angular responses of a plurality of riser models and computing a likelihood function for each of the model responses:
selection logic for selecting the likelihood function corresponding to the model having a response which most closely approximates that of the riser; and
a lookup table for supplying to said compensation filter means filter coefficients corresponding to the selected likelihood function.

5. The position reference system of claim 4 wherein said processing means comprises a plurality of Kalman filters.

6. The position reference system of claim 5 wherein said compensation filter comprises:
means for attenuating a first band of frequencies centered on a first frequency in the signal supplied by said first transfer means;
means for attenuating a second band of frequencies centered on a second frequency in the signal supplied by said first transfer means; and
means for attenuating frequencies above a predetermined multiple of the first frequency in the signal supplied by said first transfer means.

7. The position reference system of claim 6 wherein said first transfer means includes means for weighting the lower and upper angle signals by complementary factors and summing the resultant signals.

8. The position reference system of claim 7 wherein the lower angle signal is weighted by a factor of approximately 0.3 and the upper angle signal is weighted by a factor of approximately 0.7.

9. In a marine vessel position indicating system, a method for obtaining a signal indicative of the horizontal position of the marine vessel relative to an underwater wellhead from deviations from vertical of a riser extending between the vessel and the wellhead, comprising:
producing lower angle signals indicative of deviation from vertical of the riser at a position proximate the wellhead;
producing upper angle signals indicative of deviation from vertical of the riser at a position proximate the marine vessel;
combining the lower and upper angle signals;
determining riser parameters from the lower and upper angle signals;
filtering the combined signals in accordance with filter characteristics which are determined by the riser parameters; and
utilizing the filtered signals to indicate vessel position.

10. The method of claim 9 including the further steps of:
producing a first weighted sum of the lower and upper angle signals;
attenuating high frequency components in the first weighted sum;
attenuating low frequency components in the filtered signals; and
combining the signals resulting after foregoing attenuating steps to produce the signal utilized to indicate vessel position.

11. The method of claim 10 wherein the step of filtering the combined signals comprises:
attenuating a band of frequency components centered on a first frequency:
attentuating a band of frequencies centered on a second frequency; and
attenuating frequency components higher than a predetermined multiple of the first frequency.

12. The method of claim 11 wherein the predetermined multiple is approximately 3.

13. The method of claim 9, 10 or 11 wherein the step of determining riser parameters comprises:
processing the upper and lower angle signals through a plurality of Kalman filters corresponding to different riser model responses;
determining a likelihood function corresponding to each of the model responses;
selecting the likelihood function corresponding to the model whose response most closely approximate that of the riser; and
adjusting characteristics of the filtering applied to the combined signals in accordance with predetermined filter coefficients corresponding to the selected likelihood function.

14. The method of claim 13 wherein the step of adjusting filtering characteristics includes adjusting the first and second frequencies on which the first and second attenuated bands of frequency components are respectively centered.

15. The method of claim 14 wherein:
the step of producing lower angle signals comprises producing first and second lower angle signals indicative of deviations from vertical of the riser in two orthogonal vertical planes;
the step of producing upper angle signals comprises producing first and second upper angle signals indicative of deviations from vertical of the riser in two orthogonal vertical planes;
the first and second upper angle signals and the first and second lower angle signals are transformed into signals in a common coordinate system;
the first lower and upper signals are weighted by complementary factors and summed to produce a second weighted sum;
the second lower and upper angle signals are weighted by complementary factors and summed to produce a third weighted sum; and
the second and third weighted sums are filtered and the filtered signals utilized to indicate vessel position in a horizontal plane.

* * * * *

UNITED STATES PATENT OFFICE
CERTIFICATE OF CORRECTION

PATENT NO. : 4,351,027
DATED : September 21, 1982
INVENTOR(S) : TOM A. GAY, et al It is certified that error appears in the above-identified patent and that said Letters Patent are hereby corrected as shown below:

Title page, lefthand column, after "Assignee:

Honeywell Inc., Minneapolis, Minnesota,"

add --and Exxon Production Research

Company, Houston, Texas--.

Signed and Sealed this

Fourteenth Day of December 1982

[SEAL]

Attest:

GERALD J. MOSSINGHOFF

Attesting Officer    Commissioner of Patents and Trademarks

UNITED STATES PATENT OFFICE
CERTIFICATE OF CORRECTION

PATENT NO. : 4,351,027
DATED : September 21, 1982
INVENTOR(S) : TOM A. GAY, et al It is certified that error appears in the above-identified patent and that said Letters Patent are hereby corrected as shown below:

Column 14, line 28,
Claim 13 - third paragraph, the word "approximate" should be --approximates--

Signed and Sealed this

First Day of February 1983

[SEAL]

Attest:

GERALD J. MOSSINGHOFF

Attesting Officer   Commissioner of Patents and Trademarks